July 13, 1943.   C. P. WALKER ET AL   2,324,340
DETECTOR FOR PRESSURE WAVE TRANSLATION SYSTEMS
Filed Feb. 8, 1941   2 Sheets-Sheet 1
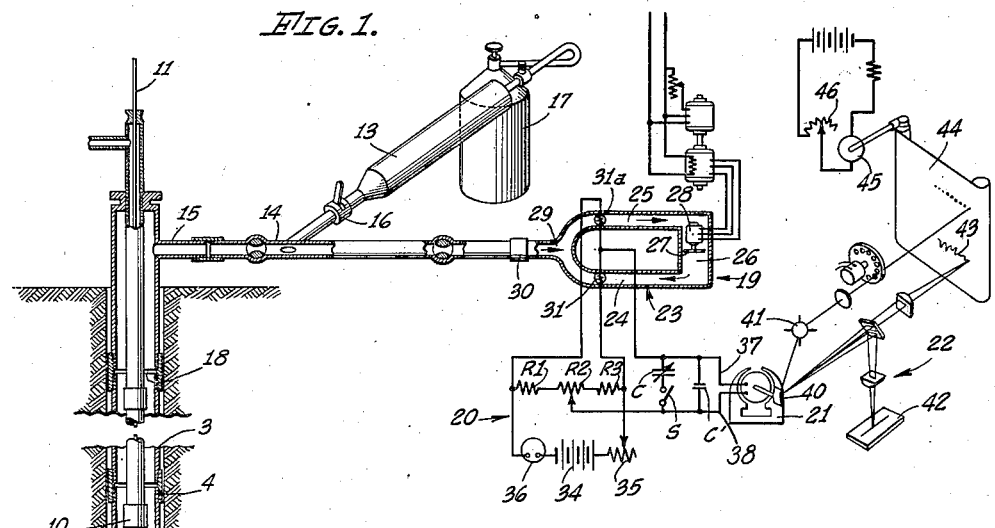
FIG. 1.
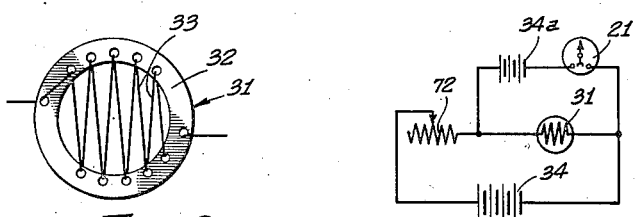
FIG. 4.
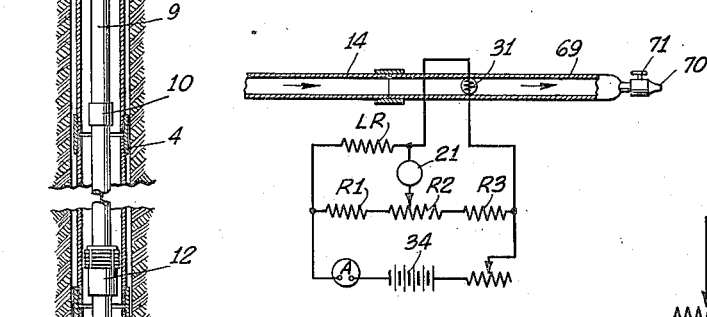
FIG. 2.
FIG. 3.
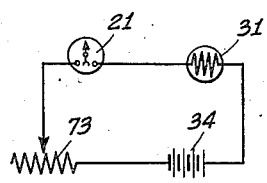
FIG. 5.
CRANFORD P. WALKER,
EDWARD E. SIMMONS,
INVENTORS.
BY *Harold W. Mattingly*
ATTORNEY.

July 13, 1943.    C. P. WALKER ET AL    2,324,340
DETECTOR FOR PRESSURE WAVE TRANSLATION SYSTEMS
Filed Feb. 8, 1941    2 Sheets-Sheet 2

CRANFORD P. WALKER,
EDWARD E. SIMMONS,
INVENTORS.

BY *Harold W. Mattingly*
ATTORNEY.

Patented July 13, 1943

2,324,340

UNITED STATES PATENT OFFICE 2,324,340

DETECTOR FOR PRESSURE WAVE TRANSLATION SYSTEMS

Cranford P. Walker, San Marino, and Edward E. Simmons, Pasadena, Calif.; said Simmons assignor to said Walker Application February 8, 1941, Serial No. 377,976

18 Claims. (Cl. 177—352)

Our invention relates to a detector for pressure wave translation systems and has particular reference to a detector which discriminates between waves of compression and waves of rarefaction to accurately translate such waves.

In many systems for registering or recording waves, such as sound waves or acoustic waves which may be either audible or below audible frequency, it is desirable to have such registering or recording mechanism so arranged as to cause compression waves to be registered as compression waves and waves of rarefaction to be registered as waves of rarefaction so that they may be distinguishable one from the other.

For example, such a pressure wave translation system may be employed for locating obstructions in oil wells or for locating the fluid levels in oil wells by the pressure-echo method, such as is illustrated and described in Patent No. 2,156,519, issued May 2, 1939, to Cranford P. Walker, wherein is described a system in which a pressure impulse is introduced into a well bore or within the well casing, and by means of suitable pressure responsive mechanism coupled to the well the echo or partial reflection of the impulse from each of the obstructions in the well, such as tubing couplings, casing joints, tubing catchers and fluid surface may be received at the ground surface and registered or recorded in their pressure-time relation relative to each other. By such pressure-time relation, the distance from the ground surface to any one of the obstructions may be readily determined.

Certain obstructions which project inwardly of the well bore or of the casing tending to restrict the cross sectional area of the well bore or casing will register as compression waves while other elements in the well bore, such as the space between adjacent sections of casing at the couplings between the casing pipe sections, perforations in the casing or perforated liner used in the well, will produce reflections as waves of rarefaction which may be received and registered at the ground surface as rarefaction waves. For example, it is the usual practice in oil wells to employ casing in the well bore which is of considerably smaller outside diameter than the diameter of the well bore itself, providing an annular space therebetween. This is also true of the relative diameters of the well bore and the perforated casing or screen through which the oil or gas is permitted to enter the interior of the casing.

Thus a pressure impulse introduced into the well creates a pressure wave therein which will, as it travels down the well, encounter a group of such perforations and a part of the pressure wave will be permitted to pass out into the annular space, thus creating a wave of rarefaction which is received at the ground surface as a diminution of the pressure impinging upon the microphone, diaphragm or other pressure responsive device employed to receive and translate the echoes for purposes of registering and recording them. However, such portion of the pressure wave as is permitted to expand through the perforations into the annular space outside of the perforated pipe sometimes strikes some point in the annular space which has been bridged over by sand or shale and is reflected back to the surface therefrom as a wave of compression. It follows therefore that the pressure changes which occur at the ground surface as the pressure wave passes downwardly past a series of openings or perforations are made up of a complex series of waves of compression and waves of rarefaction which, if properly detected and recorded as distinguishable waves of compression and waves of rarefaction, is a true representation of the contour of the path traversed by the wave.

While many types of mechanical or electrical pressure responsive devices, such as that described in Patent No. 2,156,519 hereinbefore referred to, may be employed at the ground surface for the detection and translation of the pressure changes, the simplest and least expensive detector is one which is constructed along the lines of a hot wire type of microphone wherein a wire heated by electric current passing therethrough is exposed to the pressure existing within the casing of the well and which, as the gas particles pass over the heated wire as pressure within the casing changes, cools the wire and thus alters the electric current passing therethrough. Such hot wire type of microphone, constituting little or no obstruction to the passage of gas through the pipe or chamber in which it is located, is particularly advantageous for this work since it is not subject to destructive distortion when subjected to relatively great pressure changes as are other types of pressure responsive devices embodying a diaphragm obstructing the free flow of gas and the rapid equalization of pressure on opposite sides of such diaphragms.

However, such hot wire types of pressure responsive elements are not discriminatory between waves of rarefaction and waves of compression which may impinge upon them, in either instance the passage of the gas particles over the heated wire causing the resistance of the wire to decrease, and producing similar changes in electric current values for both compression waves and rarefaction waves.

It is therefore an object of our invention to provide a pressure responsive device employing such hot wire type elements and in which such pressure responsive device is capable of discriminating between rarefaction waves and compression waves and thus produce changes in electric current values which correctly represent either of such waves.

Another object of our invention is to provide a system for biasing a hot wire type of pressure responsive device so that waves of rarefaction impinging thereon will cause a change of electric current values in one direction while waves of compression impinging thereon will cause a change of electric current values in an opposite direction.

Another object of our invention is to provide a simple electrical circuit arrangement which may be employed with hot wire types of pressure responsive devices for correctly translating and recording rarefaction waves in a manner which distinguishes from the translation thereby of compression waves.

Another object of our invention is to provide a simple electrical circuit arrangement which may be employed with a gas stream biased hot wire type of pressure responsive device for correctly translating and recording both the magnitude and direction of pressure fluctuations occurring at the casing head of a well and the functioning of which is not appreciably affected by moderate fluctuations in the gas stream velocity or intensity of the supply voltage or by adjustments of the heating current and sensitivity while a recording is being made.

Other objects and advantages of our invention will be apparent from a study of the following specifications, read in connection with the accompanying drawings, wherein Fig. 1 is a diagrammatic view illustrating a typical oil well cross section and the location and character of the apparatus required to produce a pressure impulse in the well and for receiving and translating the echoes of such impulse from the various obstructions, openings or perforations within the well;

Fig. 2 is a detail view of one form of hot wire pressure responsive element which may be readily employed with the system shown in Fig. 1;

Fig. 3 is a diagrammatic view of a modification of the pressure responsive mechanism which may be substituted for the pressure responsive mechanism shown in Fig. 1;

Fig. 4 is a diagrammatic view of a modified form of electric wiring system which may be used with the pressure responsive device shown in Fig. 3;

Fig. 5 is a wiring diagram illustrating a still further modification of an electric circuit which may be employed with the pressure responsive device shown in Fig. 2;

Figure 6:
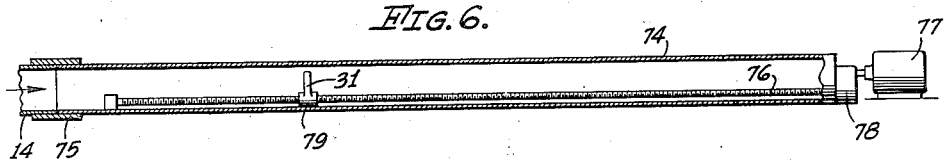
Fig. 6 is a diagrammatic view of a modified form of mounting of the hot wire element shown in Fig. 2.

Referring to the drawings, we have illustrated diagrammatically in Fig. 1 a typical oil well cross section, comprising an earth bore 1, usually lined with casing 2 which may be constructed of a series of relatively large diameter pipe sections 3 coupled together by suitable couplings 4, the lower end of the casing including a section of perforated casing indicated at 5, having a plurality of holes or openings 6 through which oil and gas may enter the interior of the casing and rise therein to some level indicated at 7. Such wells usually include a suitable pump mechanism, indicated generally at 8, immersed below the surface 7 of the fluid in the well, the pump being usually suspended upon a string of oil flow tubing 9 comprising a series of pipe lengths coupled together by means of tubing collars or couplings 10, the tubing string extending to the ground surface and through which a string of sucker rods 11 extends downwardly to the pump so that suitable pump operating mechanism at the ground surface may be employed to reciprocate the sucker rods and plunger of the pump for the purpose of pumping oil up through the oil flow tubing 9. One or more tubing catchers 12 may be located along the tubing string 9.

As described in Patent No. 2,156,519, noted above, a pressure impulse may be created within the casing of the well by any suitable means such as by creating a sharp noise in the well or by suddenly introducing into or releasing from the casing of the well a quantity of gas to either suddenly increase or suddenly decrease the pressure in the gas column in the annular space between the tubing string 9 and the casing 2. For example, a pressure chamber 13 may be coupled to a pipe 14 which in turn communicates with the interior of the casing 2, as indicated at 15, so that by operating a quick-opening valve 16 a measured volume of gas may be drawn suddenly into the pressure chamber 13 from the well or a charge of a measured volume of gas under predetermined pressure may be stored up within the chamber 13 from a suitable supply tank 17 and suddenly discharged into the well casing.

The pressure impulse so created will produce a pressure wave which will travel down the well and will be partially reflected from each of the obstructions therein. For example, there will be a distinct reflection or echo from each of the tubing collars or tubing couplings 10, another reflection from the tubing catcher 12 and another reflection from the fluid surface 7. Also the joints or space 18 between adjacent sections 3 of the casing will produce echoes while, as explained hereinbefore, any break in the casing walls or the encountering by the pressure wave of the perforations 6 in the perforated casing section or liner will likewise produce reflections. All of these reflections or echoes will pass upwardly through the well casing and through the pipe 14 where they may be detected and translated by means of a pressure responsive apparatus indicated generally at 19 which will translate the pressure changes into electric current values by means of a suitable electric circuit indicated generally at 20, and which electric current values may be passed to a suitable galvanometer or electric responsive device indicated at 21, which constitutes a part of a suitable registering and recording mechanism indicated generally at 22.

As pointed out hereinbefore it is especially desirable to employ a hot wire type of pressure responsive mechanism but, because of the inability of such device to discriminate between the direction in which the gas particles are moved over the hot wire, it is necessary to provide some means for causing such hot wire elements to make that directional distinction. We have devised a number of ways in which to impose such directional discrimination upon this type of pressure responsive device, the fundamental characteristic of which is in causing a stream of gas to flow past the hot wire element in a uni-lateral direction and at a velocity considerably in excess of the velocity which will be imparted to the gas particles in the stream by the pressure variations imposed upon the stream by the reflections or echoes from the well.

One form of such device is illustrated in Fig. 1 as comprising a gas chamber 23 constructed so as to provide a continuous annular path for the flow of gas with mechanism located therein to provide a moving stream of gas circulating about the annulus at the desired velocity. The form of chamber 23 includes a pair of side legs 24 and 25 interconnected at their outer ends by means of a back leg 26 in which is located a fan or blower 27 driven by any suitable means as, for example, an electric motor 28 contained wholly within the back leg 26 so as to avoid the necessity of providing stuffing boxes or other packed joints by which movable shafts or other power driven apparatus extending through the walls of the chamber 23 may be made leak-proof, particularly under the high pressures of gas to which such chamber may be subjected when coupled to a well having high gas pressures therein.

The motor 28 and blower 27 may be operated in such manner as to produce a continuous gas flow in the direction of the arrows shown in Fig. 1.

The inner ends of the legs 24 and 25 are connected together by means of a Y portion 29 of the chamber 23, the central leg of which is coupled as indicated at 30 to the pipe 14 so as to communicate the interior of the annular chamber 23 with the interior of the well casing and thus subject the interior of the annular chamber 23 to the pressure variations existing within the casing of the well.

In each of the legs 24 and 25 we locate a hot wire pressure responsive element 31 and 31a, respectively, such elements 31 and 31a being illustrated diagrammatically in Fig. 1 and which may be constructed in any suitable manner. In Fig. 2 we have illustrated one form of hot wire element which is particularly adaptable for this purpose as comprising a ring 32 of suitable insulation material which may fit the transverse cross sectional area of the leg of the chamber in which it is located and which ring 32 carries an electric resistance wire 33 disposed in a series of convolutions so as to extend substantially uniformly across the cross sectional area of the leg within which the instrument is located.

With this structure it will be apparent that if the two hot wire elements 31 and 31a are supplied with electric current to heat them to some predetermined value and the gas within the annular chamber 23 is circulated at some predetermined rate, such circulating gas will cool both of the hot wire elements 31 and 31a an equal amount and that the static pressure of the gas existing in the well casing to which the elements are exposed will cause no change in either of the hot wire elements.

Now when an echo or pressure wave from the well causes a momentary change in the pressure from the existing static pressure, the two hot wire elements 31 and 31a will be subjected to an increase or decrease in the velocity of the gas particles which are passing over them. Assuming that the echo produces a compression wave tending to increase the pressure within the chamber 23, such increase in pressure will cause a movement of gas particles from the pipe 14 towards the Y portion 29. At the Y portion 29 such movement of gas particles will be divided and a portion of them will tend to move toward the leg 24 in opposition to the gas flow caused by the blower 27, thus decreasing the velocity of the gas particles in the leg 24 while the movement of gas particles through the other leg of the Y will cause a movement of gas particles into leg 25 which will aid the normal flow of gas particles under the influence of the blower 27, thus increasing the effect of the gas particles upon the hot wire element 31a.

Thus the hot wire element 31 will become hotter and its resistance will increase while at the same time the hot wire element 31a will become cooler, decreasing its resistance.

On the other hand, should the echo produce a wave of rarefaction in the pipe 14, the result will be an increase in the velocity of the gas particles past the hot wire element 31 and a decrease of the velocity of the gas particles past the hot wire element 31a, causing a reverse condition to exist between the hot wire elements.

By connecting the two hot wire elements 31 and 31a in an electric circuit by which the difference between the conductivity of the two elements may be measured, it follows that a wave of rarefaction may be detected as a wave of rarefaction and a wave of compression may be detected as a wave of compression, and that the amplitude of these waves will so register upon the two hot wire elements as to produce an amplitude of current values corresponding thereto.

In Fig. 1, we have illustrated at 26 a Wheatstone bridge circuit which may be successfully employed, in which the hot wire element 31 comprises one arm of the bridge, the hot wire element 31a comprises an adjacent arm of the bridge, while resistances R1, R2 and R3 comprise jointly the third and fourth arms of the bridge. A suitable source of electric current such as a battery 34 is coupled to supply current respectively between the resistor R1 and the hot wire element 31a and between the resistor R3 and the hot wire element 31, a current adjustment variable resistor 35 being employed to control the amount of the heating current while an ammeter 36 may be employed for the purpose of measuring the heating current. In this way the heating current and sensitivity of response may be varied at will without disturbing the balance of the bridge circuit. Resistor R2 is for the purpose of balancing the bridge under static pressure conditions in the well. Across the mid points of the bridge circuit is connected a galvanometer 21 as by means of conductors 37 and 38.

Employing this circuit and the two hot wire elements 31 and 31a, it follows that when a wave of compression occurs the resistance of the hot wire element 31a will be decreased and the resistance of the hot wire element 31 will be increased, causing the galvanometer 21 to move in one direction. On the other hand, when a wave of rarefaction occurs, the resistance of the hot wire element 31 will be decreased, accompanied by an increase in the resistance of the hot wire element 31a and the galvanometer will be caused to move in the opposite direction.

Thus the movements of the galvanometer 21 will accurately represent not only the amplitude of the pressure change which has impinged upon the hot wire elements 31 and 31a but will also denote by the direction of movement whether or not such movement is caused by a wave of rarefaction or by a wave of compression.

As pointed out in the Cranford P. Walker Patent No. 2,156,519 hereinbefore referred to, and in the copending application of Cranford P. Walker Serial No. 164,534, it is frequently desirable to accent the echoes from certain selected obstructions over echoes from other obstructions and pressure variations which may result from other disturbances. For example, it is particularly desirable to accent the periodically recurring echoes from approximately uniformly spaced obstructions in the well such as the tubing joints or tubing collars, or the casing joints so that by noting the length of the sections of pipe which have been employed in the well to make up the tubing string or the casing string, it is possible to count the tubing collar or casing joint reflections and thus compute the distance to the fluid level or to some other obstruction of unknown location. Alternatively, the space along the record chart which is occupied by a given number of adjacent recorded peaks, designating the periodically recurring echoes of tubing collars or casing joints, may be measured and employed as a scale with which to measure or compute the distance represented by the space along the chart between a peak representing the introduction of the pressure impulse into the well and another peak representing the echo from some obstruction of unknown location. In order to accent these periodically recurring echoes, it is desirable that the pressure responsive device be rendered particularly responsive to the frequency of these periodically recurring echoes which may be readily accomplished by employing some tuning device in the electrical circuits associated with the hot wire elements 31 and 31a.

In Fig. 1 we have illustrated such tuning apparatus which may be successfully employed with any one of the circuits illustrated and described herein as comprising a variable capacitance C arranged in circuit with a suitable switch S by which the capacitance C may be connected at will in parallel with the galvanometer, the value of capacitance being so selected or variable as indicated in Fig. 1 to permit the tuning of the galvanometer to respond more readily to tubing collar echoes or casing joint echoes which will occur at a given frequency depending upon the length of the tubing string sections and the velocity of the pressure wave in the particular well. By employing the switch S this tuning effect may be removed from the system whenever it is desired to have the recorded wave-form represent the reproduction of the wave-form of the pressure echo waves emanating from the well whenever it is desired to study such wave-forms without the distortion which would be imposed thereon by the tuning effect of the capacitance C. A second capacitance C' may be permanently connected across the galvanometer 21 to filter out high frequencies if desired.

The movements of the galvanometer 21 may be registered and recorded by means of the apparatus illustrated in the Cranford P. Walker application, Serial No. 164,534, filed September 18, 1937, wherein is described in detail the employment of a mirror 40 on the movable element of the galvanometer 21 arranged to receive light from a suitable source of light 41 and to reflect the same through suitable lenses and refractors to produce a pencil of light upon a screen 42 where the fluctuations resulting from the pressure variations may be observed and to produce a pencil of light which will describe an observable wave pattern 43 upon a suitable light-sensitive chart 44, which may be driven at any desired speed by means of a motor 45 controlled by means of a suitable resistance 46. Thus the pressure variations resulting from the reflections of the pressure impulse from the various obstructions in the well will be registered or recorded as an observable wave pattern, each obstruction producing its own characteristic set of wave forms, permitting them to be distinguishable one from the other and particularly emphasizing the distinction between waves of compression such as may be produced from tubing collars, tubing catchers, fluid surface, etc. and waves of rarefaction (either with or without accompanying waves of compression) such as those produced by holes in the casing and portions of the perforated casing or screen employed adjacent the oil or gas bearing sands.

As pointed out hereinbefore, the fundamental requirement for making the hot wire elements directional in their function of measuring or detecting the pressure variations is that of causing a normal gas flow past the hot wire elements when subjected only to static pressure conditions in the well such that the momentary gas particle movement which occurs as a result of the pressure variations constitutes small increases and decreases in the velocity of the gas particles superimposed upon this normal gas flow.

Figure 8:
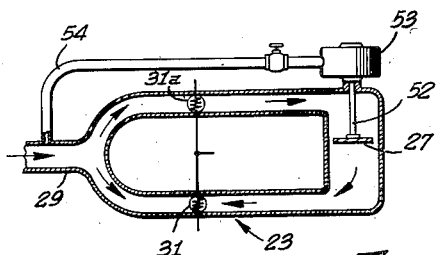
Fig. 8 is a diagrammatic view of a still further modified form of pressure responsive device which may be substituted for the pressure responsive device shown in Fig. 1.

This normal gas flow may be produced in a number of different ways; for example, In Fig. 8 we have illustrated another way of producing the normal gas flow in which the chamber 23, corresponding in all respects to the chamber 23 shown in Fig. 1, is provided with a blower or fan 27 but which in this instance is driven by means of a shaft 52 extending through the wall of the chamber 23 where it is driven by means of a gas turbine 53, gas pressure for which is supplied by means of a by-pass tube 54 communicating with the central leg of the Y portion 29 of the chamber 23 so that the static pressure of the gas within the well casing may be employed as a motive power for producing the normal circulating flow of gas within the chamber 23.

Figure 10:
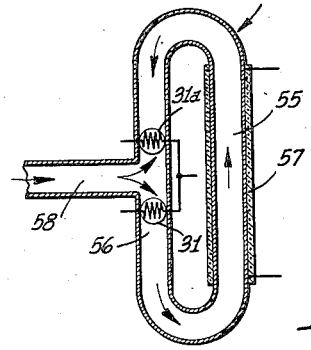
Fig. 10 is a still further modified form of pressure responsive device which may be substituted for that shown in Fig. 1.

In Fig. 10 we have illustrated a thermo-siphon method of producing the normal gas flow as by providing the annular chamber 23b with a pair of relatively long vertically extending legs 55 and 56, the leg 55 having applied thereto a suitable heating element 57 which may be an electrical or mechanical heating element, while the gas from the well is admitted to the annular chamber 23b through an entrance pipe 58 which communicates with the central portion of the opposed leg 56. In this instance the hot wire elements 31 and 31a will be located in the leg 56 below and above, respectively, the entrance pipe 58. The heat applied to the leg 55 will cause the gas within the annular chamber 23b to rise in the leg 55 and to descend in the leg 56, thus imparting the desired directional characteristic to the hot wire elements 31 and 31a.

Figure 7:
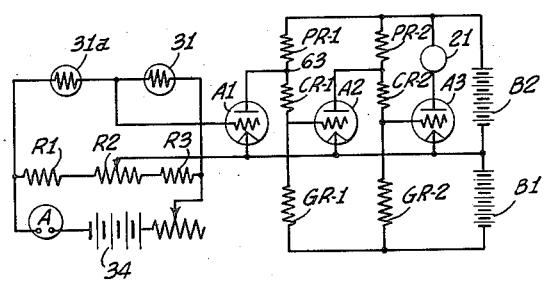
Fig. 7 is a modified form of wiring diagram which may be employed with the pressure responsive device shown in Fig. 1.

It may be desirable in connection with the annular chamber forms of pressure responsive devices, as illustrated in Figs. 1, 8 and 10, to amplify the pressure variations which are measured by the hot wire elements, one such arrangement being illustrated diagrammatically in Fig. 7, wherein we have illustrated a circuit which is particularly adaptable for this purpose and which in effect is a direct current amplifier and has substantially zero frequency response characteristics.

The hot wire elements 31 and 31a are connected in a bridge circuit which is in all respects identical with that shown in Fig. 1 but in which, instead of interposing the galvanometer directly across the bridge between the two hot wire elements and the resistor R2, the output of the bridge circuit is connected, respectively, to the cathode and grid of an amplifier tube A1. The amplifier tube A1 is connected in a circuit which includes a pair of batteries B1 and B2 coupled in series with each other, one terminal of the battery B2 being connected through a plate load resistor PR—1 to the plate of the tube A1, such connection being made at 63, from which a branch circuit including a coupling resistor CR—1 and a grid resistor GR—1 are interposed in a return circuit coupled to the other terminal of the battery B1.

A second stage of amplification includes an amplifier tube A2 which is similarly connected in a substantially identical circuit with the grid of the tube A2 connected between the coupling resistor CR—1 and the grid resistor GR—1, the tube A2 having associated with it a plate load resistor PR—2, a coupling resistor CR—2 and a grid resistor GR—2. A third stage of amplification may be employed as indicated by the amplifier tube A3, the grid of this tube being similarly connected between the coupling resistor CR—2 and the grid resistor GR—2. The output of the third stage of amplification may be passed directly to the galvanometer 21. By the elimination of any capacitance coupling between the tubes A1, A2 and A3 and by maintaining the values of PR—1, CR—1 and GR—1, PR—2, CR—2 and GR—2 relatively small, the frequency response of the system may be maintained at substantially zero while substantial amplification of the signal currents resulting from pressure variations may be made.

Figure 9:
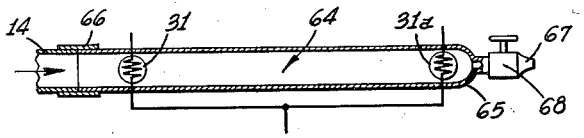
Fig. 9 is a diagrammatic view of a still further modified form of pressure responsive device which may be substituted for the pressure responsive device shown in Fig. 1.

While the pressure responsive devices thus far described include some auxiliary means for producing a normal circulation velocity of gas past the heating elements 31 and 31a, an arrangement may be employed with wells having considerable gas pressure in the casing which utilizes the gas flow from the well to produce the normal gas velocity past the elements 31 and 31a which is required to produce the desired directional characteristics. One form of such arrangement is illustrated in Fig. 9 wherein the chamber in which the hot wire elements may be located is illustrated as comprising an elongated closed tubular chamber 64, the outer end 65 of which is provided with an exhaust outlet 67 having a cross section considerably less than the cross section of the tubular chamber 64. The inner end 66 of the chamber 64 may be coupled directly to the pipe 14 so that the gas from the well tends to flow into the chamber 64. By controlling the effective size of the outlet 67 as by means of a suitable valve 68, a portion of the gas from the well may be allowed to escape through exhaust 67 and thus provide a continuous gas stream past the hot wire elements 31 and 31a which are located, respectively, near the inner end of the chamber 64 and immediately adjacent the outer end 65. The hot wire elements 31 and 31a in the form of the device shown in Fig. 9 may be coupled to any of the 2-element circuits hereinbefore described.

Utilizing this arrangement, it will be apparent that there is a considerably large volume of the chamber 64 at the rear of the hot wire element 31 while there is a much smaller volume of the chamber 64 at the rear of the hot wire element 31a and hence pressure wave reflections will cause a considerable change in the movement of gas particles adjacent the hot wire element 31 and will cause substantially little or no movement of the gas particles adjacent the hot wire element 31a and the difference in the gas particle movement will be detected by the two hot wire elements and may be employed to unbalance the bridge circuit in the same manner as was described with reference to Fig. 1. However, the steady or continuous flow of the gas stream past the two hot wire elements 31 and 31a as the gas passes through the chamber and out of the exhaust outlet 67 will affect both of the hot wire elements equally and will cause no unbalancing of the bridge circuit so that the gas particle movement resulting from the reflections will cause an unbalancing of the bridge in one direction for waves of compression and in the opposite direction for waves of rarefaction.

Referring particularly to Fig. 3, it will be observed that a directional characteristic may be imparted to even one hot wire element 31 as by locating the element 31 in a short length of pipe 69 which is coupled to the pipe 14, arranging on the outer end of the pipe 69 an exhaust opening 70 controlled by a suitable valve 71. Thus the gas from the well is allowed to flow continuously past the element 31 at such rate, regulated by the valve 71, as will insure a normal gas velocity in excess of the velocity imparted to the gas particles by compression or rarefaction waves.

By employing the single element 31, as illustrated in Fig. 3, such element may be connected in a simple bridge circuit as shown in Fig. 3. The bridge circuit shown in Fig. 3 is identical with the bridge circuit shown in Fig. 1 with the exception that a loading resistor LR has been substituted in one leg of the bridge for the hot wire element 31a, the resistance value of the resistance LR being selected to correspond to the resistance of the hot wire element 31.

Another form of circuit may be successfully employed with a single hot wire element 31 which is illustrated in Fig. 4, wherein a relatively low resistance galvanometer 21 is employed in a potentiometer circuit including a main source of electric current such as battery 34 which supplies current through a variable resistor 72 while the galvanometer 21 is shunted across the hot wire element 31. An auxiliary battery 34a is employed in series with the galvanometer 21 to balance the voltage drop across the hot wire element when no signal is being received.

Still another form of circuit which may be employed with a single hot wire element 31 is shown in Fig. 5 wherein the hot wire element 31 is disposed in a simple circuit which includes a battery 34, the hot wire element 31, the galvanometer 21 and a variable resistor 73 all in series relation.

In Fig. 6 we have illustrated still another manner of producing a normal gas velocity past a hot wire element in which a relatively long tubular chamber 74 is employed coupled as indicated at 75 to the pipe 14. Disposed longitudinally of the chamber 74 is an elongated feed screw 76 adapted to be rotated at any selected constant speed by means of a motor 77 coupled to the feed screw through suitable reduction gearing indicated at 78. The hot wire element 31 is mounted upon a carriage 79, threaded upon the feed screw 76.

The length of the chamber 74, the length and pitch of the feed screw 76 and the speed with which the same will be rotated is selected such that the hot wire element 31 will be moved at a continuous constant velocity from the end of the chamber adjacent the motor toward the end of the chamber coupled to the pipe 14 during the entire period over which the measurement is to be made, namely, during the period of time between the creation of the pressure impulse and the arrival at the ground surface of the reflection from the lowermost obstruction in the well (usually the fluid level). By this arrangement it will be apparent that the motion of the hot wire element within the chamber 74 causes a constant velocity of gas to pass the hot wire element and thus impart to it the directional characteristics hereinbefore described.

While we have shown and described a number of different arrangements by which such directional characteristics may be imparted to a simple hot wire pressure responsive element, it is to be noted that the fundamental requirement is that of providing the constant velocity of gas particles past the hot wire element or elements so that the change of velocity of gas particle flow imparted by the reflected waves of compression or rarefaction will cause the hot wire element to either increase the amount of current flowing therethrough or decrease the amount of current flowing therethrough, dependent upon the direction of the pressure change resulting from a particular echo.

While we have shown and described the preferred embodiment of our invention, we do not desire to be limited to any of the details of construction shown or described herein, except as defined in the appended claims.

We claim:

1. In a system for detecting and observing echoes of a pressure impulse from various obstructions in an oil well, a device responsive to fluid velocity for translating changes in velocity to changes in electric current, means exposing said device to the gas pressure in the casing of the well, means coupled to said device and responsive to said electrical current changes for observably registering the same, and means for passing a continuous flow of said well gas past said device at a velocity in excess of the velocity change imparted to the gas by the pressure waves to be observed, whereby waves of compression and rarefaction will be distinguishably registered.

2. In a system for detecting and observing echoes of a pressure impulse from various obstructions in an oil well, a device responsive to fluid velocity for translating changes in velocity to changes in electric current, means exposing said device to the gas pressure in the casing of the well, means responsive to electric current changes for observably registering the same, electrical circuit means interconnecting said device and said current responsive means, means for passing a continuous flow of said well gas past said device at a velocity in excess of the velocity change imparted to the gas by the pressure waves to be observed, whereby waves of compression and rarefaction will be distinguishably registered, and means in said circuit for causing said electric current responsive device to respond more readily to selected periodically recurring pressure waves than to other pressure waves.

3. In a system for detecting and observing echoes of a pressure impulse from various obstructions in an oil well, a device responsive to fluid velocity for translating changes in velocity to changes in electric current, a pressure chamber exposed to gas pressure in the casing of the well for mounting said device in the path of movement of the well gas, means coupled to said device and responsive to said electric current changes for observably registering the same, and means for causing a continuous flow of said gas in said chamber past said device at a velocity in excess of the velocity change imparted to the gas by the pressure waves to be observed, whereby waves of compression and rarefaction will be distinguishably registered.

4. In a system for detecting and observing echoes of a pressure impulse from various obstructions in an oil well, a pair of devices responsive to fluid velocity for translating changes in velocity to changes in electric current, an elongated chamber exposed to the gas pressure in the casing of the well, means for mounting said devices in spaced relation to each other along said chamber, means for passing a continuous flow of said well gas successively past said devices at a velocity in excess of the velocity change imparted to the gas by the pressure waves to be observed, and means coupled to said devices and responsive to the difference of the current changes produced by each of said devices for observably registering the same.

5. In a system for detecting and observing echoes of a pressure impulse from various obstructions in an oil well, a pair of devices responsive to fluid velocity for translating changes in velocity to changes in electric current, an annular chamber having an opening exposed to the gas pressure in the casing of the well, said velocity responsive devices being disposed in said annular chamber in spaced relation to each other about the annulus, means associated with said annular chamber for creating a circulating flow of said well gas past said devices at a velocity in excess of the velocity change imparted to the gas by the pressure waves to be observed, means coupled to said devices and responsive to the sum of the current changes produced by each of said devices for observably registering the same.

6. In a system for detecting and observing echoes of a pressure impulse from various obstructions in an oil well, a pair of devices responsive to fluid velocity for translating changes in velocity to changes in electric current, an annular chamber having an opening exposed to the gas pressure in the casing of the well, said velocity responsive devices being disposed in said annular chamber in spaced relation to each other about the annulus, means within said annular chamber for creating a circulating flow of said gas past said devices at a velocity in excess of the velocity change imparted to the gas by the pressure waves to be observed, and means coupled to said devices and responsive to the sum of the current changes produced by each of said devices for observably registering the same.

7. In a system for detecting and observing echoes of a pressure impulse from various obstructions in an oil well, a pair of devices responsive to fluid velocity for translating changes in velocity to changes in electric current, an annular chamber having an opening exposed to the gas pressure in the casing of the well, said velocity responsive devices being disposed in said annular chamber in spaced relation to each other about the annulus and on opposite sides of the opening to the well gas, a blower in said annular chamber for creating a circulating velocity of said gas past said devices at a velocity in excess of the velocity change imparted to the gas by the pressure waves to be observed, an electric motor disposed wholly within said chamber for driving said blower, means coupled to said devices and responsive to the sum of the current changes produced by each of said devices for observably registering the same.

8. In a system for detecting and observing echoes of a pressure impulse from various obstructions in an oil well having a gas pressure above atmospheric pressure, a pair of devices responsive to fluid velocity for translating changes in velocity to changes in electric current, an annular chamber having an opening exposed to the gas pressure in the casing of the well, said velocity responsive devices being disposed in said annular chamber in spaced relation to each other about the annulus and on opposite sides of the opening exposed to the well gas, means coupling said annular chamber to receive said gas under pressure freely within the chamber, and means actuated by the gas pressure in said well gas for causing a circulation of said gaseous medium about the annulus at a velocity in excess of the velocity change imparted to the well gas by the pressure waves to be observed.

9. In a system for detecting and observing echoes of a pressure impulse from various obstructions in an oil well having a gas pressure in excess of atmospheric pressure, a device responsive to fluid velocity for translating changes in the velocity to changes in electric current, an elongated chamber having an entrance opening at one of its ends exposed to the gas pressure in the casing head of the well and through which the well gas may freely enter and having a restricted exit opening at the other of its ends whereby said gas may flow through said chamber at a predetermined rate, and means mounting said device within said chamber in the path of the flow of gas therethrough.

10. In a system for detecting and observing echoes of a pressure impulse from various obstructions in an oil well, a device responsive to fluid velocity for translating changes in velocity to changes in electric current, means exposing said device to the gas pressure in the casing of the well, a Wheatstone bridge circuit including said device as one of the arms of said bridge, means connected across said bridge and responsive to said electric current changes for observably registering the current changes, and means for passing a continuous flow of said well gas past said device at a velocity in excess of the velocity change imparted to the gas by the pressure waves to be observed, whereby the direction of current flow across the said bridge will distinguish between echoes starting with waves of rarefaction and echoes starting with waves of compression in said gas.

11. In a system for detecting and observing echoes of a pressure impulse from various obstructions in an oil well, a device responsive to fluid velocity for translating changes in velocity to changes in electric current, means exposing said device to the gas pressure in the casing of the well, a Wheatstone bridge circuit including said device as one of the arms of said bridge, means connected across said bridge and responsive to said electric current changes for observably registering the current changes, means for passing a continuous flow of said well gas past said device at a velocity in excess of the velocity change imparted to the gas by the pressure waves to be observed, whereby the direction of current flow across the said bridge will distinguish between echoes starting with waves of rarefaction and echoes starting with waves of compression in said gas, and amplifying means having a substantially zero frequency response interposed between said bridge and said current responsive means for amplifying the effect of said current changes.

12. In a system for detecting and observing echoes of a pressure impulse from various obstructions in an oil well, a pair of devices responsive to fluid velocity for translating changes in velocity to changes in electric current, a chamber having an opening exposed to the gas pressure in the casing of the well and for mounting said devices in spaced relation to each other along the length of said chamber, means for passing a continuous flow of said well gas past said devices at a velocity in excess of the velocity change imparted to the gas by the pressure waves to be observed, a Wheatstone bridge circuit including said devices as adjacent arms of said bridge and including ballast resistors as the remaining arms of said bridge, and means responsive to said electric current changes for observably registering the same connected between the mid points of said bridge between the two devices and between the ballast resistors.

13. In a system for detecting and observing echoes of a pressure impulse from various obstructions in an oil well, a pair of devices responsive to fluid velocity for translating changes in velocity to changes in electric current, an elongated chamber exposed to the gas pressure in the casing of the well, means for passing a continuous flow of said well gas longitudinally of said chamber at a velocity in excess of the velocity change imparted to the gas by the pressure waves to be observed, means for so mounting said devices in spaced relation to each other along said chamber and in the flow of gas therethrough that the gas particle movement resulting from pressure changes in the gas will differently affect the two devices, and means coupled to said devices and responsive to the difference of the current changes produced by each of said devices for observably registering the same.

14. In a system for detecting and recording echoes of a pressure impulse from various obstructions in an oil well, a device responsive to fluid velocity for translating changes in velocity to changes in electric current, means exposing said device to the gas pressure in the casing of the well, means coupled to said device and responsive to electric current changes for recording the same, and means for passing a continuous flow of the well gas past said device at a velocity in excess of the velocity change imparted to the gas by the echoes to be observed, whereby compression echoes and rarefaction echoes may be distinguishably recorded.

15. In a system for detecting and recording echoes of a pressure impulse from various obstructions in an oil well, a hot wire device responsive to velocity of the fluid medium for translating changes in velocity to changes in electric current, means exposing said device to the gas in the well casing, means coupled to said device and responsive to electric current changes for recording the same, and means for passing a continuous flow of the well gas past said device at a velocity in excess of the velocity change imparted to the gas by the echoes to be observed, whereby compression echoes and rarefaction echoes may be distinguishably recorded.

16. In a system for detecting and recording echoes of a pressure impulse from various obstructions in an oil well using a device exposed to the gas pressure in the casing of the well and which is responsive to fluid velocity for translating changes in velocity to changes in electric current, the method of imparting directional discrimination to said device, which comprises subjecting the device to a normal continuous flow of the well gas past said device at a velocity in excess of the velocity changes imparted to the gas by the echoes to be observed.

17. In a system for detecting and recording echoes of a pressure impulse from various obstructions in an oil well using a device exposed to the gas pressure in the casing of the well and which is responsive to fluid velocity for translating changes in velocity to changes in electric current, the method of imparting directional discrimination to said device, which comprises producing during the detecting and recording operations a continuous uni-directional relative motion between the well gas and the said device at a velocity in excess of the velocity change imparted to the gas by the echoes to be observed.

18. In a system for detecting and recording echoes of a pressure impulse from various obstructions in a well, a device responsive to fluid velocity for translating changes in velocity to changes in electric current, means exposing said device to the gas pressure in the casing of the well, means coupled to said device and responsive to electric current changes for recording the same, means for producing during the detecting and recording operations a uni-directional motion between the well gas and said device at a velocity in excess of the velocity changes imparted to the well gas by the echoes to be observed whereby compression echoes and rarefaction echoes may be distinguishably recorded.

CRANFORD P. WALKER.
EDWARD E. SIMMONS.